Sept. 5, 1967 R. A. PETERSON 3,339,658
CONTROLS FOR EARTHMOVING SCRAPERS CONNECTED IN TANDEM
Filed Dec. 2, 1964 2 Sheets-Sheet 1
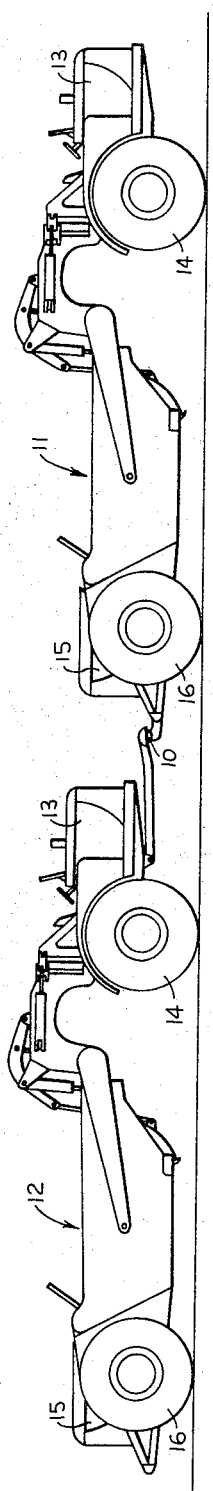
INVENTOR.
ROBERT A. PETERSON
BY
ATTORNEYS

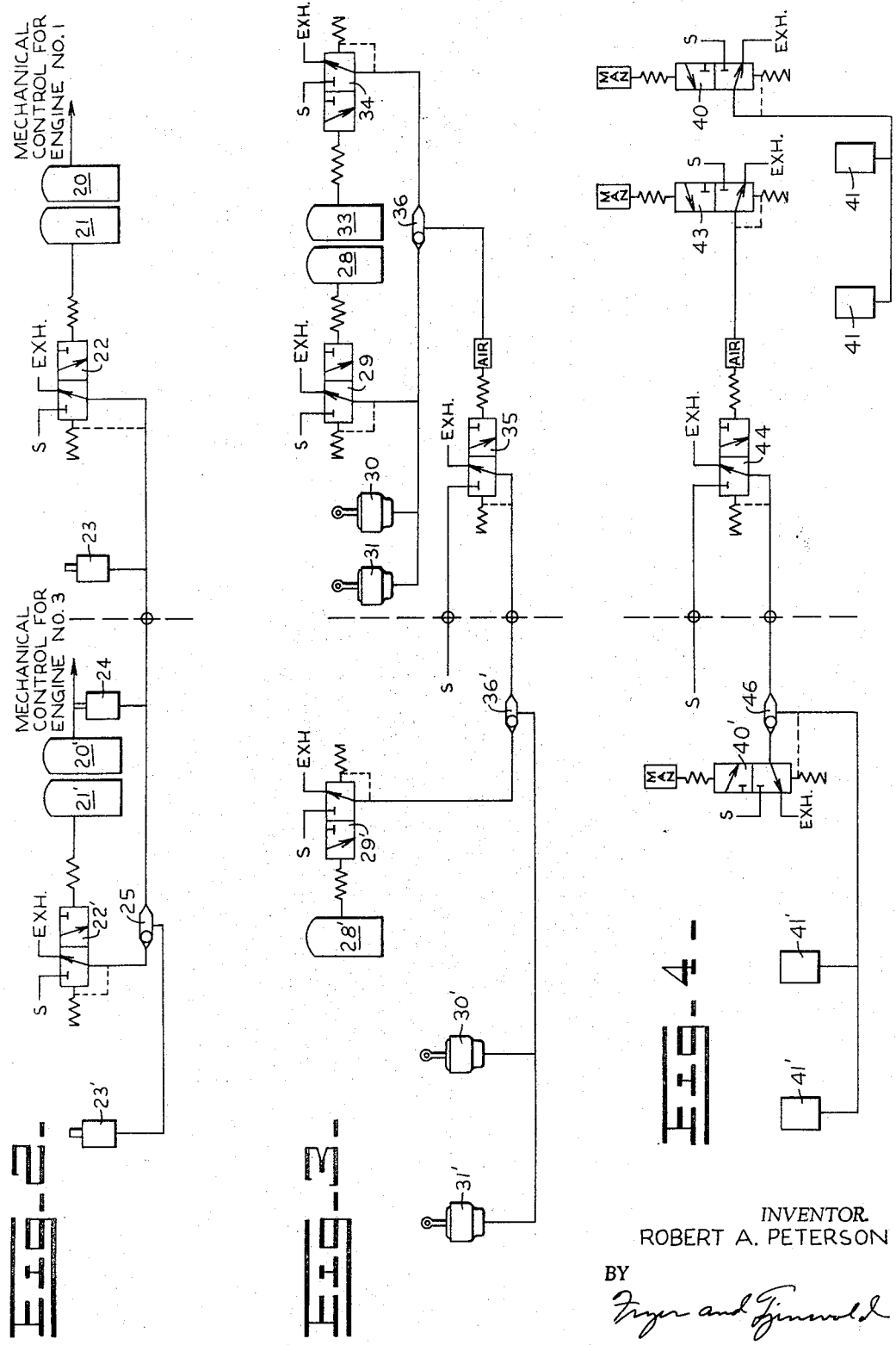

3,339,658
CONTROLS FOR EARTHMOVING SCRAPERS
CONNECTED IN TANDEM
Robert A. Peterson, San Leandro, Calif., assignor to
Caterpillar Tractor Co., Peoria, Ill., a corporation
of California
Filed Dec. 2, 1964, Ser. No. 415,525
1 Claim. (Cl. 180—14)

ABSTRACT OF THE DISCLOSURE

Controls for earthmoving scrapers connected in tandem and particularly to accelerating and retarding controls for two or more machines operating in tandem where all control of the machines is concentrated at a single operator's station and wherein upon separation of the tandem machines, each machine retains a complete operable set of controls.

---

The use of two or more large earthmoving units controlled by a single operator has proven feasible both mechanically and economically. However the cost of such multiple units is very high and since many earthmoving projects are not sufficiently large nor topographically suited to their use this high cost cannot be justified because of the possibility that they will be out of service a great part of the time.

It is the object of the present invention to provide an arrangement of scraper units in tandem wherein complete adequately powered and independently operable units are coupled together with only small variations in their controls whereby they may be readily uncoupled and placed in readiness for service as individual units on projects where the combination machines are not practical.

It is also an object of the invention to provide a control system for machines in which fuel feed and application of brakes and retarders may be accomplished from a single operator's station on one machine to enable independent or simultaneous actuation and properly sequenced operation of the controlled components of both machines.

Further and more specific objects and advantages of the invention and the manner in which it is carried into practice are made apparent in the following specification wherein reference is made to the accompanying drawings.

In the drawings:

FIG. 1 is a view in side elevation of a pair of large earthmoving scrapers coupled for tandem operation;

FIG. 2 is a schematic view illustrating the control circuit for actuating the fuel feed or governors of the engines;

FIG. 3 is a similar view of the brake control circuit; and

FIG. 4 is a similar view showing retarder control circuits.

While the drawings show two earthmoving scrapers of a known type coupled in tandem, it is to be understood that the invention is applicable to other types of earthmoving equipment and is not limited to any particular number of individual units. It will be apparent upon an understanding of the invention gained from the following description that additional units may be added and controlled in accordance with the teachings of the present invention.

FIG. 1 of the drawings shows two earthmoving scrapers coupled in tandem as by suitable brackets and a ball and socket joint 10. The first scraper is generally indicated at 11 and the second scraper at 12. The scrapers are substantially identical and have forward engines located at 13 and adapted to drive the wheel 14 of a two-wheel tractor unit which forms the forward portion of the scraper. A second engine 15 on the scraper drives the rear wheels 16 which support the rear end of the scraper bowl. Each of the scrapers has conventional fuel control means for its engines, separate control means for the brakes on each pair of wheels as well as control means for fluid retarders which augment the action of the brakes in reducing the speed of the unit. These controls are shown schematically in FIGS. 2, 3 and 4 wherein the forward scraper components are shown on the right hand side of the broken line and the rearward components on the left hand side, the line representing a point between the tandem components as for example the ball and socket joint 10 of FIG. 1.

The governor controls are shown in FIG. 2 wherein each tractor is shown as having two accelerator pedals shown at 20 and 21 on the first unit and 20' and 21' on the second unit. The pedals 20 and 20' are mechanically linked to the governor of one of the engines 13 on the tractor portions of the scrapers. The linkages are conventional and therefore not shown and function in the usual manner to increase engine speed upon depression of the pedals. The pedals 21 and 21' are placed adjacent the pedals 20 and 20' so that each pair of pedals may be operated individually or simultaneously with the operator's foot. The pedals 21 and 21' are mechanically connected to air valves 22 and 22' respectively so that, upon depression of the pedal, air under pressure from the supply S will be directed to a pneumatic cylinder 23 or 23' to actuate the throttles of the engines 15 on the respective bowl portions of the scraper units.

In accordance with the present invention, the basic systems just described are maintained intact so that the engines of each scraper unit may be controlled independently when the tandem scrapers are separated at the ball joint 10. This is accomplished, as shown in FIG. 2, by connecting the air line from the valve 22, which actuates the governor of the rear engine through the cylinders 23, with an additional pneumatic cylinder shown at 24 which actuates the pedal 20' controlling the forward engine on the second machine. The same line is also continued through a shuttle valve 25 to communicate with the pneumatic cylinder 23' controlling the throttle of the rear engine on the rear machine. Consequently for application of a small amount of power, such as might be required when the tandem machines are operating with no load or on a level road, depression of the pedal 20 in the forward machine will supply fuel to the forward engine of the forward machine. However depression of both pedals 20 and 21 simultaneously will supply fuel to all four engines giving the tandem unit full power for loading or other heavy duty work.

When the machines are separated, the pneumatic cylinder 24 on the second machine performs no function and shifting of the valve 22' by depression of the pedals 21' directs air to pneumatic cylinder 23' for controlling the governor of the rear engine. In this case the position of the ball in the shuttle valve 25 is automatically reversed closing communication to the pneumatic cylinder 24 and opening communication to the cylinder 23'. Thus the governor controls of each machine are completely and independently operable when the machines are separated.

The brake systems of the two units are shown in FIG 3 comprising a brake pedal 28 on the forward unit and a brake pedal 28' on the rear unit. These brake pedals actuate air valves 29 and 29' for directing air under pressure to sets of roto chambers represented at 30 and 31 for the forward machine and 30' and 31' for the rear machine, all of which actuate brakes in the well known manner on the four wheels of each machine. Light braking is accomplished by applying the brakes of the rear machine only to prevent the possibility of jacknifing which might occur from the application of the brakes on the front machine and heavier braking is accomplished by applying all of the brakes simultaneously. For the lighter braking a separate pedal as shown at 33 on the forward unit, actuates an air valve 34 for directing air to a relay valve 35 which when opened admits air from the source to the roto chambers 30' and 31' on the rear tractor. Air in this case passes through shuttle valves 36 and 36' shown in the position when the brakes of the rear unit only are applied. Upon application of all of the brakes of both units the ball of the shuttle valve 36 moves to the opposite position.

In this case depression of pedal 28 actuates the brakes on the front unit and also on the rear unit as described. The shuttle valve 36' will shift only when the units are separated so that pedal 28' is in control of the rear unit.

The relay valve 35 is disposed on the forward tractor and the source of air under pressure controlled by the relay valve is disposed on the rear tractor so that if there is any failure of the air lines on the rear unit, the supply of air under pressure on the forward unit is not lost and the brakes continue to be operable. All of the air valves which control the application of pressure to the brakes such as the valves 34, 35 and 29' are of the modulating type wherein they are balanced between springs and the pressure of the air applied is added to the force of one spring to close the valves at a pressure proportional to the force applied by the operator as is conventional practice in brake circuits. It is also common practice to employ relay valves (not shown) similar to that shown at 35 between the roto chambers 30, 31 and the roto chambers 30', 31' for the purpose of safeguarding the brakes on the front wheel on the machine if there is breakage of an air line in the rear wheel system.

Thus the application of a single one of two pedals on the forward machine of a tandem combination and a simple circuit controlled by the pedals enables control selectively of the brakes on two machines without interfering with completely independent control of the brakes in a conventional manner when the machines are uncoupled and operating individually.

Many large machines employ fluid retarders to augment the action of conventional friction brakes and these retarders are charged with liquid under pressure by air from a conventional load cylinder. The retarder controls of a tandem scraper, as shown in FIG. 1, are schematically shown in FIG. 4 wherein manually actuated air valves of the modulating type shown at 40 and 40' on the front and rear scrapers, respectively, control the flow of air under pressure from a source to pairs of load cylinders 41 and 41' which are employed for charging retarders in the well known manner mentioned above. To enable control of retarders on tandem machines from a single station on one machine, a second valve 43 which may be identical with the valves 40 and 40' is placed at the operator's station on the forward machine and controls flow to a relay valve 44. This relay valve like that shown at 35 in FIG. 3 is carried on the forward scraper and controls flow of air under pressure from a source on the rearward scraper for protection of the circuit on the forward machine. When the valve 43 is used for charging the load cylinders on the rear machine, a shuttle valve 46 acts to isolate the normal valve 40' on the rear machine.

What is claimed as new is:

Controls for earthmoving machines connected for operation in tandem in which each machine has independent power and braking means and individual controls therefor, auxiliary control circuits extending between the machines, and controls on one machine for actuating its power and braking means or the power and braking means selectively on other machines whereby each machine is independently operable upon breaking of its tandem connection, each machine including a forward and a rear engine, two accelerator controls on one machine, said controls comprising two foot pedals sufficiently close to be simultaneously pressed by an operator's foot, one of said pedals controlling the forward engine of the forward machine, and the other pedal controlling all other engines on all machines.

References Cited

UNITED STATES PATENTS

| | | | |
|---|---|---|---|
| 1,804,025 | 5/1931 | North | 188—3 |
| 1,804,257 | 5/1931 | Greenley | 180—14 |
| 2,485,759 | 10/1949 | Miller | 180—6.2 X |
| 2,704,585 | 3/1955 | Stromberg | 188—152 |
| 2,711,228 | 6/1955 | Shank | 180—14 X |
| 3,027,962 | 4/1962 | Wolf | 180—77 |
| 3,127,193 | 3/1964 | Johnson et al. | 180—77 X |
| 3,245,488 | 4/1966 | Peterson | 180—14 |
| 3,255,837 | 6/1966 | Wolf | 180—14 |

A. HARRY LEVY, *Primary Examiner.*